United States Patent [19]

Kasahara et al.

[11] Patent Number: 5,345,432
[45] Date of Patent: Sep. 6, 1994

[54] OPTICAL HEAD

[75] Inventors: Akihiro Kasahara, Kawasaki; Hideo Yamasaki; Takashi Yoshizawa, both of Yokohama; Sou Ishika, Kawasaki, all of Japan

[73] Assignees: Kabushiki Kaisha Toshiba, Kawasaki, Japan;

[21] Appl. No.: 125,143

[22] Filed: Sep. 23, 1993

Related U.S. Application Data

[63] Continuation of Ser. No. 785,265, Oct. 30, 1991, abandoned.

[30] Foreign Application Priority Data

Oct. 31, 1990 [JP] Japan .................. 2-293861

[51] Int. Cl.$^5$ .................. G11B 7/00; H01J 5/02
[52] U.S. Cl. .................. 369/44.15; 369/44.140; 250/239
[58] Field of Search .................. 369/44.15, 44.16, 44.14, 369/112, 44.11, 120; 250/201.1, 239

[56] References Cited

U.S. PATENT DOCUMENTS

| | | | |
|---|---|---|---|
| 4,550,352 | 10/1985 | Nakao | 360/109 |
| 4,634,853 | 1/1987 | Kanamaru | 369/44.32 |
| 4,792,674 | 12/1988 | Hirano | 369/112 |
| 4,859,847 | 8/1989 | Matsuno et al. | 369/112 |
| 5,023,858 | 6/1991 | Nakayama | 369/112 |

FOREIGN PATENT DOCUMENTS

| | | | |
|---|---|---|---|
| 367465A2 | 9/1990 | European Pat. Off. | |
| 58-064649 | 4/1983 | Japan | 369/44.16 |
| 59-223951 | 12/1984 | Japan | 369/44.15 |
| 61-120351 | 6/1986 | Japan | 369/44.16 |
| 61-269238 | 11/1986 | Japan | 369/44.16 |

*Primary Examiner*—Aristolelis Psitos
*Assistant Examiner*—P. W. Huber
*Attorney, Agent, or Firm*—Finnegan, Henderson, Farabow, Garrett & Dunner

[57] ABSTRACT

An optical head comprises a laser beam source, a photo-detector device for receiving a laser beam emitted from the laser beam source and reflected at a data recording medium, an optical system for sending the laser beam from the data recording medium to the photo-detector device, and a base member for fixing the photo-detector device and the optical system. The photo-detector device has a photo-detector element, a mount member on which the photo-detector element is mounted, a block for fixing one end of the mount member, a spring member for applying elastic force to the mount member, a screw member for moving the photo-detector element along one direction against elastic force of the spring member and fixing the element to an arbitrary position, and a hinge portion formed in the fixing end of the mount member.

4 Claims, 6 Drawing Sheets

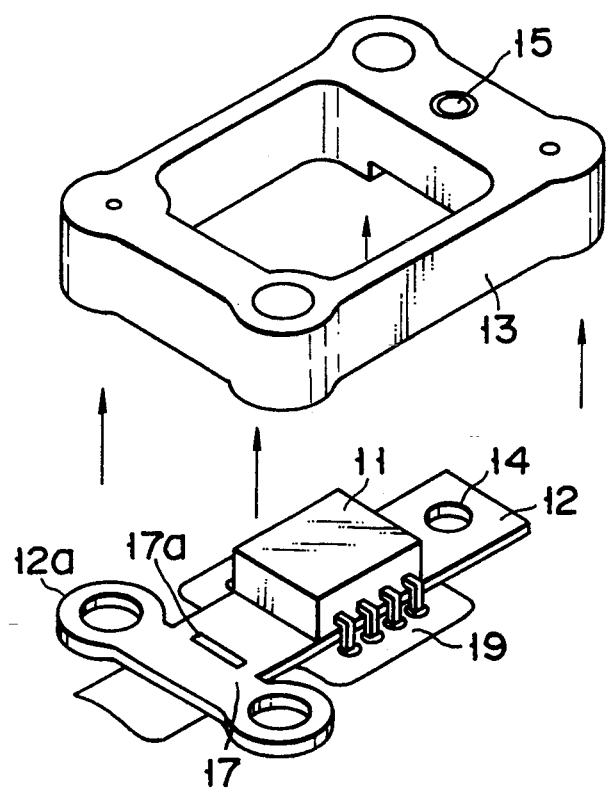
F I G. 3
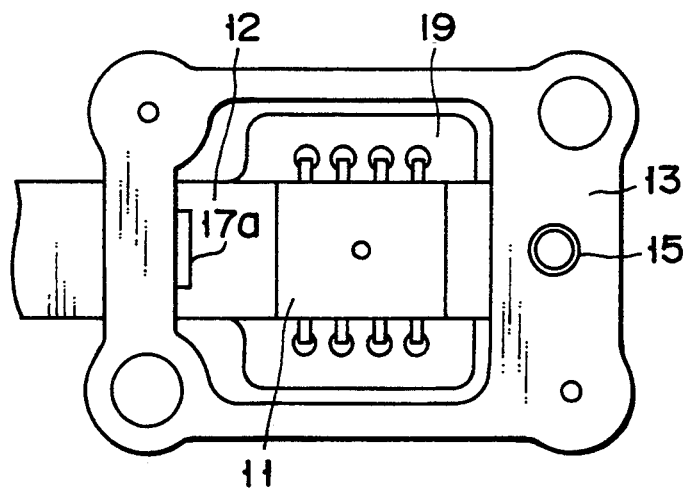
F I G. 4

OPTICAL HEAD

This application is a continuation of application Ser. No. 07/785,265 filed Oct. 30, 1991, now abandoned.

BACKGROUND OF THE INVENTION

1. Field of the Invention

The present invention relates to an optical head to be used in an information recording medium such as an optical disc device.

2. Description of the Related Art

In the general optical disc device, there is used an optical head comprising a semiconductor laser, an optical system, and a photo-detector. A laser beam emitted from the semiconductor laser is led to the optical disc through the optical system, and reflecting light reflected on the optical disc is led to the photo-detector through the optical system again, thereby reproducing data recorded in the optical disc.

The photo-detector comprises a photo-detector element for converting reflecting light into an optical signal, and a fixing block for fixing the photo-detector element. The fixing block is secured to an optical base of the optical disc device. The photo-detector is arranged such that the in-plane direction of the fixing block is perpendicular to the direction of the optical axis of light incident upon the photo-detector element.

In such a photo-detector, the fixing block is shifted in a state that the fixing block is not completely fixed, thereby adjusting two axis in-plane direction perpendicular to the direction of the optical axis. Then, a focusing lens for converging reflecting light on the photo-detector element is moved in the direction of the optical axis. Thereby, the focal position in the direction of the optical axis is adjusted to be set to a suitable position.

Since the adjustment of the conventional photo-detector is based on the signal of the photo-detector element, it is impossible to individually adjust the positions of the two axis in-plane directions and the focal position. Due to this, there is needed work for positioning the focusing lens and the fixing block correctly while the position of the focusing lens and that of the fixing block are adjusted at the same time. After positioning, the focusing lens is fixed to the optical base by a holding spring or a pressing screw. Thereafter, the focusing lens is adhered to the optical base.

However, the focusing lens slightly moves in the direction perpendicular to the optical axis when the focusing lens is fixed by a pressure bar spring or a pressure screw. Due to this, there is a problem that the focal position on the photo-detector shifts. Since the spot position on the photo-detector element must be extremely correctly adjusted, adjusting work is further needed even if the focal position slightly shifts. Due to this, it becomes difficult to perform adjusting work.

SUMMARY OF THE INVENTION

In consideration of the above problem, the present invention has been made, and its object is to provide an optical head having a photo-detector device by which adjusting work can be easily made.

According to the present invention there is provided an optical head for reproducing recorded data in an optical recording medium by radiating light to the medium and detecting the light reflected on the medium, said optical head comprising emitting mean for emitting the light; detecting means for detecting the light reflected on said medium, optical means for sending the light from said emitting means to said medium, and from said medium to said detecting means base member for integrally fixing said emitting means and said optical means; mount member, for mounting said detecting means, having a hinge portion formed in a first end portion thereof and a supporting section for said detecting means provided in a second end portion thereof; fixing member for fixing said first end portion of said mount member such that said second end portion of said mount member including said supporting section is moved along a direction of an optical axis of the light reflected on said medium at said hinge portion; urging means for urging said second end portion of said mount member along the direction of said optical axis; and adjusting means for adjusting a position of said detecting means on said optical axis by moving said second end portion of said mount member against an urging force applied by said urging means.

According to the above-mentioned structure, since the adjustment in the direction of the optical axis can be performed by moving means, there is no need that the focusing lens is moved. Therefore, the photo-detector device can be easily adjusted without causing the conventional problem in fixing the focusing lens.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is an exploded view of the device of FIG. 2;

FIG. 4 is a plane view of the device of FIG. 2;

DETAILED DESCRIPTION OF THE PREFERRED EMBODIMENTS

The present invention will be explained with reference to the drawings.

An optical head used in an optical disc device will be explained.

Figure 1:
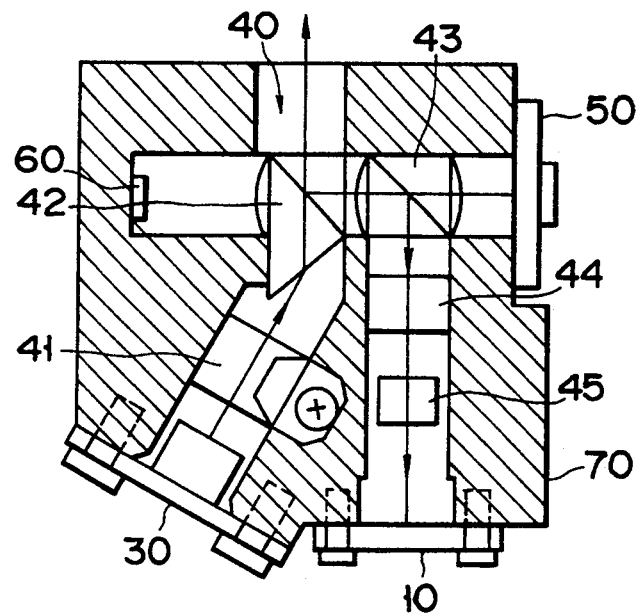
FIG. 1 is a cross sectional view showing an optical head relating to one embodiment of the present invention.

FIG. 1 is a cross sectional view showing an optical head relating to one embodiment of the present invention. The optical head comprises a semiconductor laser 30, an optical system 40, and a photo-detector device 10. The optical system 40 has a collimator lens 41, beam splitters 42, 43, a focusing lens 44, and a cylindrical lens 45. A laser beam emitted from the semiconductor laser 30 is changed to a parallel light by the collimator lens 41, and the parallel light passes through the beam splitter 42, and is led to an optical disc (not shown). A reflecting light reflected at the optical disc is led to the photo-detector device via the beam splitters 42, 43, the focusing lens 44, and a cylindrical lens 45, and converted into an optical signal, and data recorded in the optical disc is reproduced. Also, reference numerals 50 and 60 show photo-detectors for adjustment. The photo-detectors 50 and 60 are attached to an optical base 70.

Figure 2:
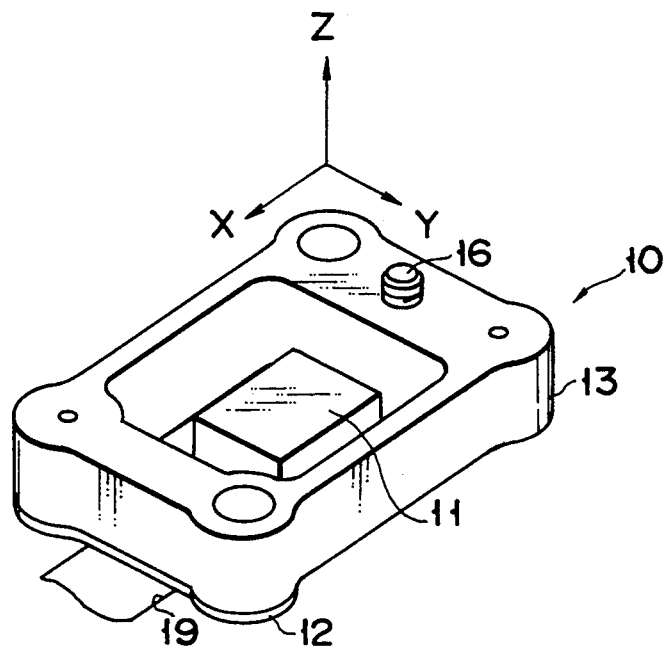
FIG. 2 is a perspective view showing one embodiment of a photo-detector device.

FIG. 2 is a perspective view showing one embodiment of the photo-detector device 10, FIG. 3 is an exploded view of the device of FIG. 2, and FIG. 4 is a plane view of the device of FIG. 2.

The photo-detector element 11 is mounted on a mount member 12 which is substantially T-shaped, and a fixing block 13 covers the mount member 12. The mount member 12 is formed of an elastic member and its one end serves as a fixing portion 12a having two screw holes. The mount member 12 is screwed to the block 13.

The photo-detector element 11 is connected to a flexible print board 19, which is formed at the lower portion of the mount member 12, thereby the signal of the photo-detector 11 is extracted.

Figure 5:
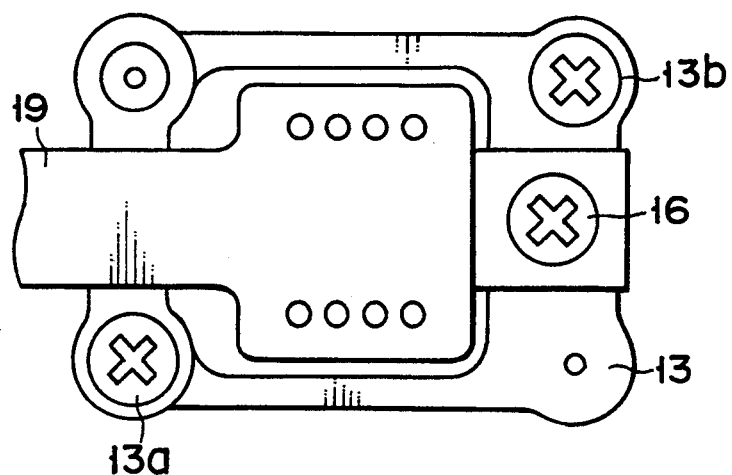
FIG. 5 is a bottom view of the device of FIG. 2.

There is formed a hole 14 in the vicinity of the end portion opposite to the fixing portion 12a of the mount member 12, that is, a free end portion. Also, in the block 13, there is formed a screw hole at the position corresponding to the hole 14. As shown in the bottom view of FIG. 5, a screw 16 is screwed to a screw hole 15 through a hole 14 from the lower side of the mount member 12.

Figure 6:
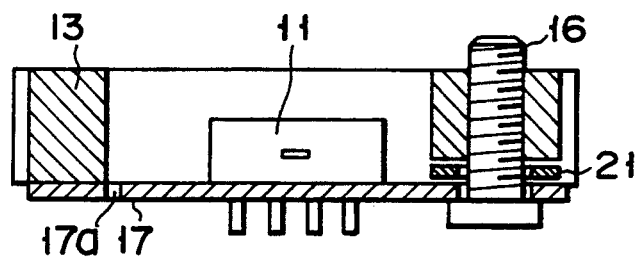
FIGS. 6 and 7 are cross sectional views of the device of FIG. 2.
Figure 7:
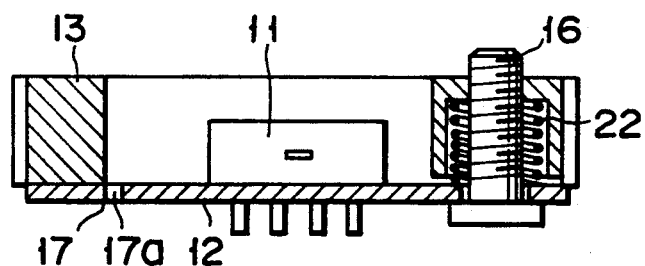

In the screw portion of the screw 16, there can be provided a spring member, for example, a plate spring 21 shown in FIG. 6 as elastic force applying means. Due to this, even if deformation of the mount member 12 is beyond an elastic deformation region, a normal adjusting operation to be explained later can be made. Moreover, the portion of the mount member 12, which is close to the free end, is always pressed to the head portion of the screw 16, so that the adjusting position can be maintained extremely correctly. As shown in FIG. 7, even if a coil spring 22 is provided in place of the plate spring 21, the same effect can be obtained. Also, a spring washer can be provided.

In the vicinity of the free end, there is formed a space between the block 13 and the mount member 12. The spring 21 or 22 as elastic force applying means is elastically deformed against its elastic force by clamping the screw 16. Also, the mount member 12, which is an elastic member, is elastically deformed against its elastic force. Therefore, an amount of displacement of the free end of the mount member 12 in a Z direction can be arbitrarily controlled, depending on the clamping state of the screw 16, and the free end can be fixed to an arbitrary position. By the movement of the free end of the mount member 12 in the Z direction, the adjustment of the photo-detector element in the direction of a axis is performed.

In the vicinity of the connecting portion of the mount member 12 and the block 13, there is provided a hinge 17. The hinge 17 has a slit 17a. By use of the slit 17a, deformation of the mount member 12 occurs mainly in the hinge 17. Due to this, stress applying to the connecting portion of the photo-detecting element 11 and the mount member 12 is relaxed, and the stable connecting state can be maintained.

As an elastic member forming the mount member 12, metal such as stainless steel and resin and resin such as fiber reinforced resin (FRP) which is reinforced by use of carbon fiber or glass fiber are preferable. Thereby, strength against a buckle or a creep increases, so that a slight shift of the photo-detector element 11 due to a change with the time can be prevented, and a stable function can be maintained for a long time. Moreover, if the mount member 12 is formed of material having electrical conductivity such as iron, the mount member can seal the print board 19, thereby the photo-detector device, which is strong against nose from the external unit, can be realized.

Figure 8:
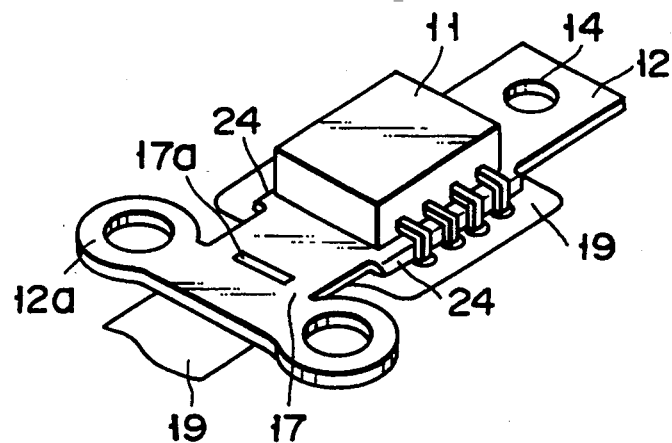
FIGS. 8 and 9 are perspective views showing a modification of the device of FIG. 2.

It is preferable to form bending portions 24 at both ends of the portion corresponding to the photo-detector element 11 of the mount member 12 as shown in FIG. 8. Thereby, bending deformation of the mount member is prevented in the connecting portion of the mount member 12 and the photo-detector element 11. Due to this, almost all stress applying between the mount member 12 and the photo-detector element 11 can be removed, and a suitable function can be maintained for a long period of time.

Figure 9:
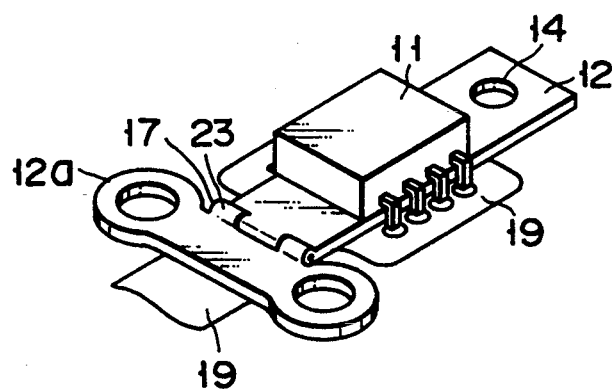

In a case where the photo-detector element 11 can be fully positioned by only elastic force of elastic applying means such as a plate spring provided in the screw portion of the screw 16, the mount member 12 is not always an elastic member. In such a case, for example, a rotatable joint section 23 may be provided in the hinge portion 17 as shown in FIG. 9.

Adjustment in X and Y axis directions can be performed by moving the block 13 along the contacting surface between the block 13 and the optical base 70. This movement is performed in a state that fixing screws 13a and 13b are loosened.

According to the above-mentioned structure, adjustment in the Z axis direction (direction of the optical axis) can be performed without moving the focusing lens. The fixture of the position in the direction of the optical axis is performed simply by applying adhesion stopping the rotation of the screw 6 after adjustment. Due to this, unlike the conventional invention, adjustment of the focal position can be easily made without moving the focal position at the time of the fixture.

In this case, the laser beam may be made incident on the photo-detector element 11 from the side of the mount member 12 (lower side in the drawing) or the side (upper side in the drawing) opposing to the mount member 12. When the laser beam incidents on the element 11 from the side of the mount member 12, a hole through which the laser beam passes is formed in the mount member 12.

Figure 10:
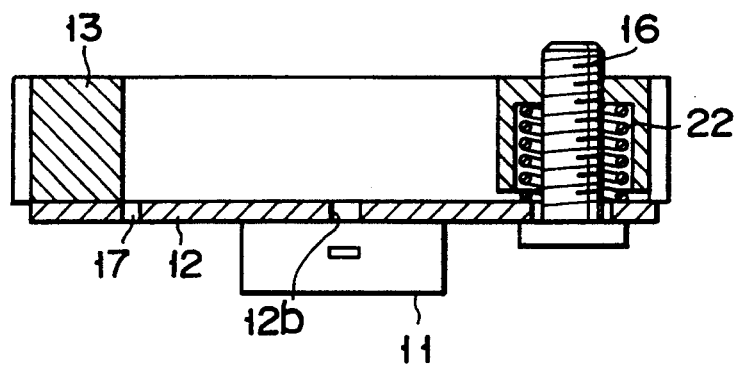
FIG. 10 is a cross sectional view showing other modification of the device of FIG. 2.

Moreover, as shown in FIG. 10, the photo-detector element 11 may be fixed to an opposing side (lower side) to the mount member 12. A hole 12b is used to introduce the laser beam. The other embodiment of the present invention will be explained.

Figure 11:
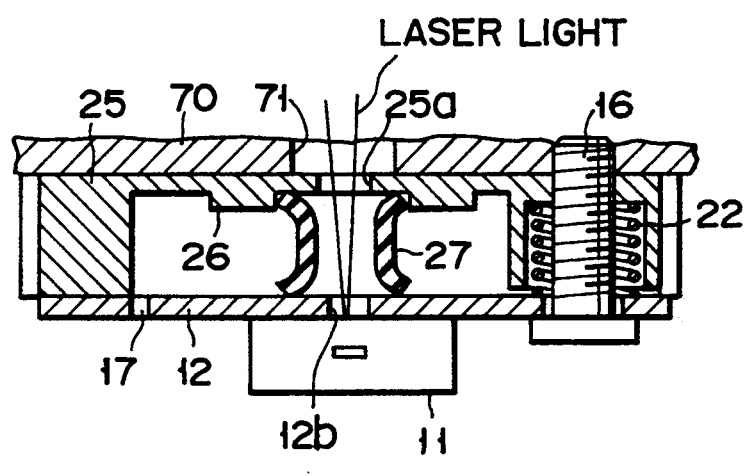
FIG. 11 is a cross sectional view showing a photo-detector device relating to the other embodiment.

FIG. 11 is a cross sectional view showing a photodetector device relating to the other embodiment. In place of the block member 13 used in the first embodiment, there is used a block member 25 wherein its upper portion other than a portion through which a laser beam passes is closed. The photo-detector element 11 is provided at the lower side of the mount member 12 similar to FIG. 10. On the upper wall of the block member 25, there is formed a hole 25a for introducing the laser beam. The laser beam passes through the hole 25a and the hole 12b of the mount member 12, and is introduced into the photo-detector element 11.

There is provided a cylindrical packing 27 to enclose the optical passage of the laser beam, which leads from the hole 25a to the photo-detector element 11, between the block member 25 and the mount member 12. The cylindrical packing 27 is formed of an elastic member such as rubber. Both ends of the packing 27 have a large diameter, and the central portion thereof has a small diameter. One end of the packing 27 is pressed onto the block 25, and the other end is pressed onto the block 25 and closely adhered thereto. The packing 27 is positioned by a projection 26 formed in the block 25.

The optical base 70 is closely adhered to the block 25, and has a closed space 71 extending to the optical system 30.

As mentioned above, the cylindrical packing 27 is formed, thereby preventing dust from entering the optical passage leading from the hole 25a to the photo-detector element. Also, since the block 25 and the optical base 70 are closely adhered to each other, dust does not enter the closed space 71 and dirt of the optical system can be prevented. Moreover, since the cylindrical packing 27 is always in contact with the mount member 12, the mount member 12 is prevented from being oscillated in a case where the mount member 12 formed of the elastic member. Therefore, there can be stabilized the output signal of the photo-detector element 11 mounted on the mount member 12.

Figure 12:
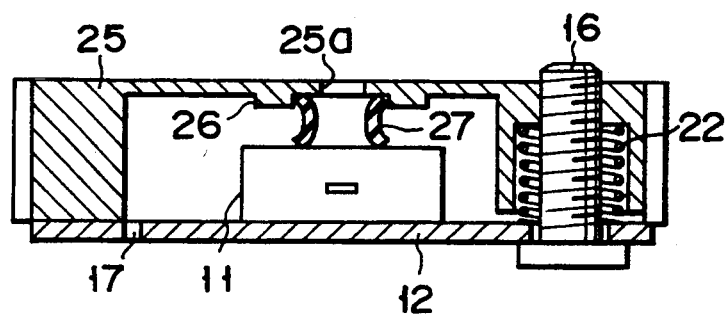
FIGS. 12 and 13 are cross sectional views showing a modification of the device of FIG. 11.

In the above embodiment, it was explained that the photo-detector element 11 was attached to the rear surface of the mount member 12 and the cylindrical packing 27 was formed between the block 25 and the mount member 12. However, as shown in FIG. 12, the photo-detector element 11 may be provided between the block 25 and the mount member 12.

Figure 13:
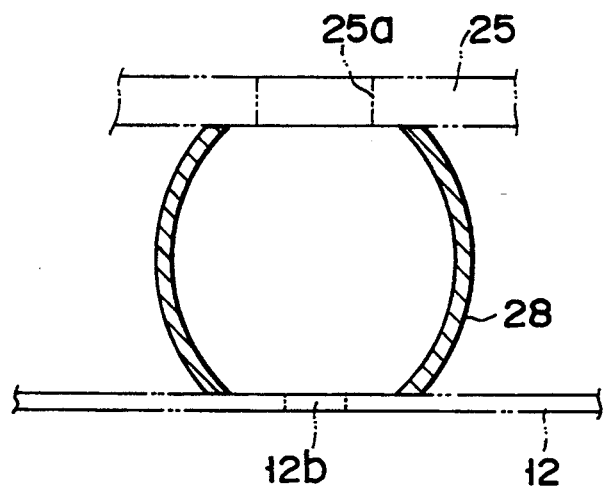

Moreover, the shape of the cylindrical packing is not limited to the above-mentioned shape. As shown in FIG. 13, a cylindrical packing having a large diameter may be formed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical head for reproducing recorded data in an optical recording medium by directing light to the medium and detecting light reflected by the medium, said optical head comprising:
   emitting means for emitting light;
   detecting means for detecting light reflected by said medium;
   optical means for directing emitted light from said emitting means to said medium, and for directing light reflected by said medium to said detecting means;
   a base member for integrally fixing said emitting means and said optical means;
   a mount member for mounting said detecting means, said mount member having a hinge portion in a first end portion thereof and a supporting section for said detecting means provided in a second end portion thereof;
   a fixing member supported by said base member for fixing said first end portion of said mount member to swing said second end portion of said mount member including said supporting section about said hinge portion, said fixing member having a hole for passing reflected light along a path between said medium and said detecting means;
   a cylindrical packing member comprising a cylindrical elastic member, said cylindrical packing member having first and second end portion shaving diameters and a central portion having a diameter smaller than the diameters of the first and second end portions, the first end portion being pressed against the fixing member and the second end portion being pressed against the mount member to surround a portion of the path, which portion extends between the fixing member and the mount member and thereby extends from said hole to said detecting means;
   urging means for urging said second end portion of said mount member along a direction affecting a position of the detecting means in the path; and
   adjusting means for adjusting the position of said detecting means in the path by moving said second end portion of said mount member against an urging force applied by said urging means in a direction to compass the cylindrical packing member.

2. The optical head according to claim 1, wherein said base member has a closed space extending about said optical means, and said fixing member is closely adhered to said base member with said hole adjoining said closed space and encompassing a portion of the path.

3. An optical head for reproducing recorded data in an optical recording medium by directing light to the medium and detecting light reflected by the medium, said optical head comprising:
   emitting means for emitting light;
   detecting means for detecting light reflected by said medium;
   optical means for directing emitted light from said emitting means to said medium, and for directing light reflected by said medium to said detecting means;
   a base member for integrally fixing said emitting means and said optical means;
   a mount member for mounting said detecting means, said mount member having a hinge portion in a first end portion thereof and a supporting section for said detecting means provided in a second end portion thereof;
   a fixing member supported by said base member for fixing said first end portion of said mount member to swing said second end portion of said mount member including said supporting section about said hinge portion, said fixing member having a hole for passing reflected light along a path between said medium and said detecting means;
   a cylindrical packing member comprising a cylindrical elastic member, said cylindrical packing member having first and second end portion shaving diameters and a central portion having a diameter smaller than the diameters of the first and second end portions, the first end portion being pressed against the fixing member and the second end portion being pressed against the detecting means;

urging means for urging said second end portion of said mount member along a direction affecting a position of the detecting means in the path; and adjusting means for adjusting the position of said detecting means in the path by moving said second end portion of said mount member against an urging force applied by said urging means in a direction to compass the cylindrical packing member.

4. The optical head according to claim 3, wherein said base member has a closed space extending about said optical means, and said fixing means is closely adhered to said base member with said hole adjoining said closed space and encompassing a portion of the path.

* * * * *